United States Patent [19]
Kawata et al.

[11] Patent Number: 5,736,067
[45] Date of Patent: Apr. 7, 1998

[54] OPTICAL COMPENSATORY SHEET AND PROCESS FOR PREPARATION OF THE SAME AND LIQUID CRYSTAL DISPLAY

[75] Inventors: Ken Kawata; Masaki Okazaki; Koh Kamada; Yoshinori Suzuki, all of Kanagawa, Japan

[73] Assignee: Fuji Photo Film Co, Ltd., Minami-ashigara, Japan

[21] Appl. No.: 627,378

[22] Filed: Apr. 4, 1996

Related U.S. Application Data

[63] Continuation of Ser. No. 348,087, Nov. 25, 1994, abandoned.

[30] Foreign Application Priority Data

Nov. 25, 1993 [JP] Japan ................................ 5-295501
May 26, 1994 [JP] Japan ................................ 6-113006

[51] Int. Cl.$^6$ ........................ C09K 19/54; G02F 1/1335
[52] U.S. Cl. ........................ 252/299.5; 349/117; 349/118; 349/121; 428/1
[58] Field of Search ........................ 252/299.01, 299.5; 428/1; 349/117, 118, 121

[56] References Cited

U.S. PATENT DOCUMENTS

| | | | |
|---|---|---|---|
| 5,308,535 | 5/1994 | Scheuble et al. | 252/299.01 |
| 5,518,783 | 5/1996 | Kawata et al. | 428/1 |
| 5,528,400 | 6/1996 | Arakawa | 349/117 |
| 5,583,679 | 12/1996 | Ito et al. | 349/118 |
| 5,646,703 | 7/1997 | Kamada et al. | 349/118 |

FOREIGN PATENT DOCUMENTS

| | | |
|---|---|---|
| 3911620 | 10/1990 | Germany. |
| 4339395 | 5/1994 | Germany. |
| WO90/16005 | 12/1990 | WIPO. |

OTHER PUBLICATIONS

CA 95:178208, 1981.

CA 111:222597, 1989.

Liquid Crystals, "On the influence of short range order upon the physical properties of triphenylene nematic discogens", T.J. Phillips et al, vol. 15, No. 2, Aug. 1993.

*Primary Examiner*—Shean C. Wu
*Attorney, Agent, or Firm*—Burns, Doane, Swecker & Mathis, LLP

[57] ABSTRACT

Disclosed is an optical compensatory sheet which comprises a layer in the condition of a mono-domain of discotic nematic phase or a monoaxial columnar phase. Further, a process for preparation of the optical compensatory sheet and a liquid crystal display provided with the optical compensatory sheet are disclosed.

20 Claims, 4 Drawing Sheets

OPTICAL COMPENSATORY SHEET AND PROCESS FOR PREPARATION OF THE SAME AND LIQUID CRYSTAL DISPLAY

This application is a continuation of application Ser. No. 08/348,087, filed Nov. 25, 1994 abandoned.

BACKGROUND OF THE INVENTION

1. Field of the Invention

The present invention relates to an optical compensatory sheet which is useful for a liquid crystal display, a process for preparation of the optical compensatory sheet and a liquid crystal display provided with the optical compensatory sheet.

2. Description of Prior Art

As a display for electronic office system-devices such as a desk-top personal computer and a word processor for Japanese language, CRT (cathode ray tube) has been employed so far. Recently, a liquid crystal display (hereinafter referred to as LCD) is increasingly employed instead of the CRT because of its thin thickness, light weight and low power consumption. LCD generally has a structure that a liquid crystal cell is disposed between a pair of polarizing sheets. Most of LCD use a twisted nematic liquid crystal. Operational mode of LCD using the twisted nematic liquid crystal is roughly divided into birefringence mode and optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large capacity by driving in time-sharing mode. However, the STN-LCD has disadvantages such as slow response (several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees is employed for displaying an image. This is called LCD of an optically rotatory mode (i.e., TN-LCD). TN-LCD display mode shows fast response (several tens of milliseconds) and high display contrast, and easily gives black-white display of high contrast. Hence, the optical rotatory mode has a number of advantages compared with the birefringence mode or other modes. However, TN-LCD has disadvantages that color or contrast on display varies depending upon viewing direction to a liquid crystal display, and its display characteristics are not comparable to display characteristics of CRT.

In order to improve the viewing angle characteristics (i.e. to enlarge the viewing angle), arrangement of a phase difference film (optical compensatory sheet) between a pair of polarizing plates and TN liquid crystal cell has been proposed in Japanese Patent Provisional Publications No. 4(1992)-229828 and No. 4(1992)-258923.

The phase difference films proposed in these Publications show no optical effect when a liquid crystal display is seen from the direction vertical to a screen of the display because phase difference in the direction perpendicular to a surface of the liquid crystal display is almost zero. However, the phase difference film serves for compensation of phase difference (depending upon wavelengths of light) that occurs when the liquid crystal display is viewed from an oblique direction. The phase difference results in unfavorable viewing angle characteristics such as coloring and disappearance of displayed image.

Even a liquid crystal display provided with such phase difference film is still not improved particularly in coloring of a displayed image and reversing of black-and-white image when the viewing direction to the liquid crystal display is greatly inclined to height or width direction to the normal to a surface of the screen. Thus, such liquid crystal display cannot be employed instead of CRT, and further is not suitable for loading in a vehicle (e.g., motor car). Japanese Patent Provisional Publications No. 4(1992)-366808 and No. 4(1992)-366809 disclose a difference phase film of a liquid crystal cell comprising a chiral nematic liquid crystal that an optic axis is inclined to enlarge the viewing angle. The difference phase film is composed of two liquid crystal cells, and therefore needs a complicated process for its preparation and brings about increase of its weight.

Japanese Patent Provisional Publications No. 4(1992)-113301, No. 5(1993)-8323 and No. 5(1993)-157913 disclose a phase difference film of polymer chain whose optic axis or an optical elastic axis is inclined from a surface of a liquid crystal cell. The phase difference film is prepared by slicing obliquely a uniaxial polycarbonate film, and therefore a phase difference film of a large area cannot be easily prepared according to the disclosed process. Further, the publications are for inventions with regard to STN-LCD and therefore give no teachings as to the use with TN-LCD.

Japanese Patent Provisional Publication No. 5(1993)-215921 discloses the use of a birefringence plate comprising a pair of supports and a rod-like compound showing liquid crystal property. The rod-like compound showing liquid crystal property is prepared by interposing and curing the compound to compensate difference phase of LCD. However, the birefringence plate has the same structure as one of the two liquid crystal cell as mentioned above, and therefore needs a complicated process for its preparation, which is not suitable for mass production. Further, its structure brings about increase of weight. Furthermore, the publications are for inventions with regard to STN-LCD and therefore give no teachings as to the use for TN-LCD.

Japanese Patent Provisional Publications No. 3(1991)-9326 and No. 3(1991)-291601 disclose an optical compensatory sheet for LCD which is prepared by coating a solution of a polymer showing liquid crystal property on an orientation layer provided on a support film. However, the polymer showing liquid crystal property is not satisfactorily oriented on the orientation layer. Hence, the resulting compensatory sheet scarcely enlarges the viewing angle from all directions.

EP 0576302 A1 discloses a phase difference plate comprising a material having optical anisotropy in a flat plate in which the direction of the principal refractive index of the index ellipsoid is inclined from the normal of the surface. The disclosed phase difference plate shows great enlargement of the viewing angle compared with other known phase difference films as mentioned above. However, LCD provided with such phase difference plate is not comparable to CRT in the viewing angle characteristics.

SUMMARY OF THE INVENTION

It is an object of the present invention to provide a novel optical compensatory sheet which is, when it is fixed on a liquid crystal cell, capable of greatly enlarging viewing angle and has improved durability.

It is another object of the present invention to provide a process for easily preparing the novel optical compensatory sheet.

It is a further object of the present invention to provide a liquid crystal display provided with a novel optical compensatory sheet wherein viewing angle is greatly enlarged and durability is improved.

There is provided by the invention an optical compensatory sheet which comprises a layer in the condition of a mono-domain of a discotic nematic phase or a monoaxial columnar phase.

A mono-domain means a domain consisting of only liquid crystal molecules which have the same orientation direction each other in a discotic nematic phase or a monoaxial columnar phase.

In the invention, the perfect mono-domain means one that no disclination is observed in the layer under a microscope of 100 magnifications. The perfect mono-domain can be, for example, obtained by stretching a polycarbonate film in such appropriate stretching ratio as to give a film of the perfect mono-domain having the same retardation as that of the layer to be tested.

The mono-domain in the invention is defined as a domain having transmittance of not less than 80% based on that of the perfect mono-domain mentioned above (preferably not less than 90%). The transmittance is determined by measuring a maximum amount of light that passes through a desired layer in the condition of a mono-domain under cross-nicol.

Preferred embodiments of the optical compensatory sheet of the invention are as follows:

1) The optical compensatory sheet which comprises a transparent support and the layer in the condition of the mono-domain provided thereon.
2) The optical compensatory sheet as above 1) wherein an orientation layer is provided between the transparent support and the layer in the condition of the mono-domain.
3) The optical compensatory sheet wherein the layer in the condition of the mono-domain is formed from a compound having a triphenylene structure in its molecule.
4) The optical compensatory sheet wherein the layer in the condition of the mono-domain is formed from a compound having the formula (1):

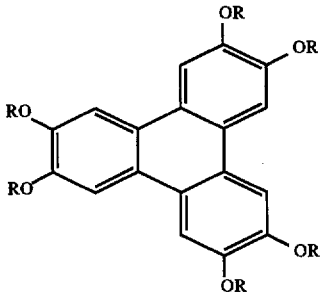

in which R represents an alkyl group, a substituted alkyl group, an aryl group, a substituted aryl group, an alkanoyl group, a substituted alkanoyl group, a substituted alkenoyl group, a substituted alkynoyl group, an aryloyl group, a substituted aryloyl group, an alkoxycarbonyl group, a substituted alkoxycarbonyl group, an aryloxycarbonyl group, a substituted aryloxycarbonyl group, a substituted carbamoyl group or a substituted sulfamoyl group.

5) The optical compensatory sheet as above 4) wherein R of the formula (1) is one substituent selected from the group consisting of $Z^2$ to $Z^9$ represented by the formulae (2) to (9):

$$Z^2 = -CO - CR^{21} = CR^{22} - C_6H_{5-n2} - R^{23}_{n2} \qquad (2)$$

in which each of $R^{21}$ and $R^{22}$ independently represents a hydrogen atom, a halogen atom, an alkyl group or a substituted alkyl group, $R^{23}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, and n2 is an integer of 0 to 5, plural substituents presented by $R^{23}_{n2}$ being the same or different from each other;

$$Z^3 = -CO - (CR^{31}R^{32})_{m3} - (Y)_{p3} - C_6H_{5-n3} - R^{33}_{n3} \qquad (3)$$

in which each of $R^{31}$ and $R^{32}$ independently represents a hydrogen atom, a halogen atom, an alkyl group or a substituted alkyl group, Y represents a oxygen atom, a sulfur atom or —NH—, $R^{33}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, m3 is an integer of 1 to 4, p3 is 0 or 1, and n3 is an integer of 0 to 5, plural substituents presented by $R^{33}_{n3}$ being the same or different from each other;

$$Z^4 = -(CR^{41}R^{42})_{m4} - (CR^{44} = CR^{45})_{p4} - C_6H_{5-n4} - R^{43}_{n4} \qquad (4)$$

in which each of $R^{41}$, $R^{42}$, $R^{44}$ and $R^{45}$ independently represents a hydrogen atom, a halogen atom, an alkyl group or a substituted alkyl group, $R^{43}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, m4 is an integer of 1 to 5, p4 is an integer of 0 to 2, and n4 is an integer of 0 to 5, plural substituents presented by $R^{43}_{n4}$ being the same or different from each other;

$$Z^5 = -(CR^{51}R^{52})_{m5} - CO - C_6H_{5-n5} - R^{53}_{n5} \qquad (5)$$

in which each of $R^{51}$ and $R^{52}$ independently represents a hydrogen atom, a halogen atom, an alkyl group or a substituted alkyl group, $R^{53}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, m5 is an integer of 1 to 4, and n5 is an integer of 0 to 5, plural substituents presented by $R^{53}_{n5}$ being the same or different from each other;

$$Z^6 = -CO - C_6H_{11-n6} - R^{63}_{n6} \qquad (6)$$

in which $R^{63}$ represents a hydrogen atom, a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, and n6 is an integer of 0 to 11, plural substituents presented by $R^{63}_{n6}$ being the same or different from each other;

$$Z^7 = -CO - C_6H_{5-n7} - R^{73}_{n7} \qquad (7)$$

in which $R^{73}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, and n7 is an integer of 0 to 5, plural substituents presented by $R^{73}_{n7}$ being the same or different from each other;

$$Z^8=-CO-R^{83} \tag{8}$$

in which $R^{83}$ represents an alkyl group, a substituted alkyl group, an alkenyl group, a substituted alkenyl group, an alkynyl group, a substituted alkynyl group, a cycloalkyl group, a substituted cycloalkyl group, a heterocyclic group, a substituted heterocyclic group, an alkylamino group or an alkylthio group;

$$Z^9=-R^{93} \tag{9}$$

in which $R^{93}$ represents an alkyl group, a substituted alkyl group, an alkenyl group, a substituted alkenyl group, an alkynyl group or a substituted alkynyl group.

6) The optical compensatory sheet as defined above 2) wherein the orientation layer is a polymer layer which has been subjected to rubbing treatment.

7) The optical compensatory sheet as defined above 2) wherein the orientation layer is prepared by obliquely depositing an inorganic compound on the support.

8) The optical compensatory sheet as defined above 1), wherein the transparent film has a light transmittance of not less than 80%, shows optically isotropy on the plane of the film, and satisfies the condition of:

$$30 \leq [(nx+ny)/2-nz] \times d \leq 150$$

in which nx and ny are main refractictive indices on the plane of the support, nz is a main refractive index in the thickness direction, and d is the thickness of the film, unit of d being nm.

Further, there is provided by the invention a process for preparation of an optical compensatory sheet, which comprises the steps of:

coating a solution containing a compound capable of forming a discotic nematic phase or a monoaxial columnar phase on a transparent support to form a coated layer, heating the coated layer to temperature for forming the discotic nematic phase or the monoaxial columnar phase, and cooling the coated layer to form a layer in the condition of a mono-domain of the discotic nematic phase or the monoaxial columnar phase.

Preferred embodiments of the process of the invention are as follows:

1) The process wherein the solution is continuously coated on the transparent support.

2) The process wherein the transparent support is a continuous transparent film.

3) The process wherein the transparent support has an orientation layer thereon and the solution is coated on the orientation layer.

4) The process wherein coating of the solution is performed using a slide coater.

5) The process as mentioned above 4) wherein the slide coater has an oblique angle of not more than 9 degrees.

6) The process wherein the solution is prepared by dissolving the compound in at least one solvent selected from the group consisting of dichloromethane, chloroform, acetone, methyl ethyl ketone, dimethylacetoamide, dimethylformamide, N-methylpyrrolydone, isopropylalcohol and perfluoropropanol.

Furthermore, there is provided by a liquid crystal display comprising a liquid crystal cell which comprises a pair of substrates provided with a transparent electrode and twist-oriented nematic liquid crystal sealed therebetween, a pair of polarizing sheets arranged on both sides of the cell, and an optical compensatory sheet provided between the liquid crystal cell and the polarizing sheet;

wherein the optical compensatory sheet which comprises a layer in the condition of a mono-domain of discotic nematic phase or a monoaxial columnar phase.

Preferred embodiments of the display of the invention are as follows:

1) The liquid crystal display wherein the optical compensatory sheet comprises a transparent support and the layer in the condition of the mono-domain provided thereon.

2) The liquid crystal display wherein an orientation layer is provided between the transparent support and the layer in the condition of the mono-domain.

3) The liquid crystal display wherein the layer in the condition of the mono-domain is formed from a compound having a carbon skeleton of triphenylene in its molecule.

The optical compensatory sheet of the invention has a discotic liquid crystal layer having a mono-domain of discotic nematic phase or a monoaxial columnar phase. Therefore, the optical compensatory sheet is, in the case of providing a liquid crystal cell with the sheet, capable of greatly enlarging viewing angle. Further, the sheet shows excellent durability because the mono-domain layer is stable in the condition of high temperature or exposure of light. Thus, the liquid crystal display provided with the sheet shows an enlarged viewing angle and excellent durability. Further, the display is greatly improved in viewing characteristics such as coloring of a displayed image and reversing of black-and-white image when the viewing direction to the liquid crystal display is greatly inclined from the normal to a surface of the screen are improved.

The discotic liquid crystal layer having a mono-domain of one of the phases can be obtained by a simple process comprising the steps of coating continuously a coating solution containing a discotic liquid crystal on a continuous transparent support, heating the layer to temperature for forming one of the phases, and cooling the layer. Thus, the optical compensatory sheet having excellent viewing characteristics can be prepared in high productivity. In other words, the sheet of a large area having uniform and excellent optical characteristics can be also easily obtained. Especially, the discotic liquid crystal layer is easily obtained by selecting the particular liquid crystal that is apt to form a mono-domain or by the use of a slide coater.

DETAILED DESCRIPTION OF THE INVENTION

Figure 1:
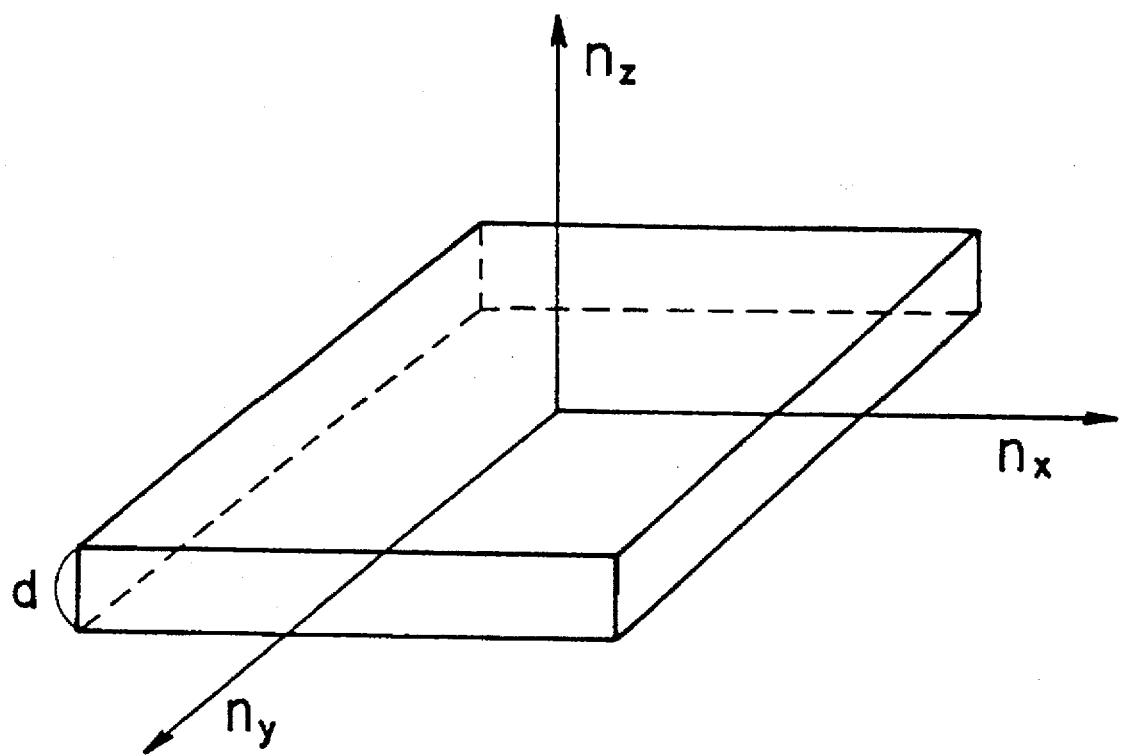
FIG. 1 is a view schematically showing the refractive indices of the three axes of the transparent film of the invention.

The optical compensatory sheet of the invention comprises a layer in the condition of a mono-domain of a discotic nematic phase or a monoaxial columnar phase. The layer is formed from a compound capable of forming discotic liquid crystal (hereinafter referred to as "discotic liquid crystal") or a mixture containing it.

The phases formed from discotic liquid crystals are roughly divided into a columnar phase wherein discotic molecules of the discotic liquid crystals are superposed in the form of column by intermolecular force, a discotic nematic phase wherein discotic molecules are aggregated in a random fashion, and a chiral discotic nematic phase wherein discotic molecules are arranged in helical structure, as described in Mol. Cryst. Liq. Cryst. (C. Destrade et al. vol. 71, pp.111, 1981). Although the columnar phase is often found during study of the discotic liquid crystal, the discotic nematic phase is seldom found, as described in Physical Properties of Liquid Crystalline Materials (W. H. de Jew, by Gordon and Beach, Science Publishers, 1980).

In the invention, a layer of the discotic liquid crystal is in the condition of the discotic nematic phase or a monoaxial columnar phase, and is required to have a mono-domain of the phase. Further, the discotic nematic phase is preferably employed.

For example, it is already known that a discotic liquid crystal having a carbon skeleton of triphenylene employed in the invention has negative birefringence as described in Mol. Cryst. Liq. Cryst. (B. Mourey et al. vol. 84, pp.193, 1982). However, for the purpose of utilizing the negative birefringence as an optical compensatory sheet, all molecules of the discotic liquid crystal are required to be statistically arranged in one direction at room temperature. Such discotic liquid crystal has a domain arranged in a certain direction in the same manner as a conventional rod-like liquid crystal on the microscopic scale, while it has, on the macroscopic scale, a feature of forming multi-domains that shows no optical anisotropy. Hence, the above discotic liquid crystal cannot be utilized as the optical compensatory sheet.

The optical compensatory sheet of the invention solves the above problem. In more detail, the optical compensatory sheet comprises a layer in the condition of a mono-domain of discotic nematic phase or a monoaxial columnar phase.

The optical compensatory sheet can be, for example, obtained by the use of the discotic liquid crystal that has preferentially a discotic nematic liquid crystal phase or a monoaxial columnar phase (of columnar phases) and by utilizing an appropriate process for forming the layer. The above discotic liquid crystal is apt to form mono-domain, which shows high transmittance and high contrast.

The discotic liquid crystal of the invention preferably has the formula (1):

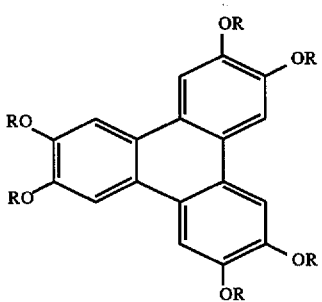

in which R represents an alkyl group, a substituted alkyl group, an aryl group, a substituted aryl group, an alkanoyl group, a substituted alkanoyl group, a substituted alkenoyl group, a substituted alkynoyl group, an aryloyl group, a substituted aryloyl group, an alkoxycarbonyl group, a substituted alkoxycarbonyl group, an aryloxycarbonyl group, a substituted aryloxycarbonyl group, a substituted carbamoyl group or a substituted sulfamoyl group. All R of the formula (1) are the same or different from each other.

Further, R of the formula (1) preferably is one substituent selected from $Z^2$ to $Z^9$ represented by the formulae (2) to (9) as mentioned above.

In the formula (2): $Z^2$=—CO—$CR^{21}$=$CR^{22}$—$C_6H_{5-n2}$—$R^{23}_{n2}$, each of $R^{21}$ and $R^{22}$ preferably represents hydrogen, $R^{23}$ preferably represents an alkyl group of 5–10 carbon atoms, a alkyl group of 5–10 carbon atoms substituted with fluorine or alkyloxy, a cycloalkyl group of 3–8 carbon atoms, an alkoxy group of 5–14 carbon atoms, or an alkoxy group of 5–10 carbon atoms substituted with alkoxy, and n2 preferably is 1 or 2.

In the formula (3): $Z^3$=—CO—$(CR^{31}R^{32})_{m3}$—$(Y)_{p3}$—$C_6H_{5-n3}R^{33}_{n3}$, each of $R^{31}$ and $R^{32}$ preferably represents hydrogen or methyl, $R^{33}$ preferably represents an alkyl group of 5–10 carbon atoms, an alkoxy group of 2–10 carbon atoms, or an alkoxy group of 2–10 carbon atoms substituted with fluorine or methoxyalkoxy, m3 preferably is 1 or 2, p3 preferably is 0 or 1, and n3 preferably is 1 or 2.

In the formula (4): $Z^4$=—$(CR^{41}R^{42})_{m4}$—$(CR^{44}$=$CR^{45})_{p4}$—$C_6H_{5-n4}$—$R^{43}_{n4}$, each of $R^{41}$, $R^{42}$, $R^{44}$ and $R^{45}$ preferably represents hydrogen, $R^{43}$ preferably represents an alkyl group of 5–10 carbon atoms, a cycloalkyl group of 3–8 carbon atoms, an alkoxy group of 2–10 carbon atoms, or an alkoxy group of 2–10 carbon atoms substituted with fluorine or methoxyalkoxy, m4 preferably is an integer of 1 to 3, p4 preferably is 0 or 1, and n4 preferably is 1 or 2.

In the formula (5): $Z^5$=—$(CR^{51}R^{52})_{m5}$—CO—$C_6H_{5-n5}$—$R^{53}_{n5}$, each of $R^{51}$ and $R^{52}$ preferably represents hydrogen or methyl, $R^{53}$ preferably represents an alkyl group of 5–10 carbon atoms, a cycloalkyl group of 3–8 carbon atoms, an alkoxy group of 2–10 carbon atoms, or an alkoxy group of 2–10 carbon atoms substituted with fluorine or methoxyalkoxy, m5 preferably is an integer of 1 to 3, and n5 preferably is an integer of 1 or 2.

In the formula (6): $Z^6$=—CO—$C_6H_{11-n6}$—$R^{63}_{n6}$, $R^{63}$ preferably represents an alkyl group of 2–10 carbon atoms, a substituted alkyl group, a cycloalkyl group of 6–12 carbon atoms substituted with alkyl, a cycloalkylcarbonyloxy group of 6–12 carbon atoms substituted with alkyl, or an aryl group of 7–12 carbon atoms substituted with alkoxy, and n6 preferably is 1.

In the formula (7): $Z^7$=—CO—$C_6H_{5-n7}$—$R^{73}_{n7}$, $R^{73}$ preferably represents an alkyl group of 5–10 carbon atoms, a cycloalkyl group of 6–12 carbon atoms substituted with alkyl, an alkoxy group of 2–10 carbon atoms, or an alkoxy group of 2–10 carbon atoms substituted with fluorine or methoxyalkoxy, and n7 preferably is 1 or 2.

In the formula (8): $Z^8$=—CO—$R^{83}$, $R^{83}$ represents an alkyl group of 5–10 carbon atoms, a cycloalkyl group of 6–12 carbon atoms substituted with alkyl, an alkoxy group of 2–10 carbon atoms, an alkoxy group of 2–10 carbon atoms substituted with fluorine or methoxyalkoxy, an alkylamino group of 2–8 carbon atoms, or an alkylthio group of 2–8 carbon atoms.

In the formula (9): $Z^9$=—$R^{93}$, $R^{93}$ represents an alkyl group of 5–10 carbon atoms, an alkyl group of 2–15 carbon atoms substituted with fluorine, methoxyalkoxy or alkylcycloalkyl.

Preferred examples of triphenylene compounds having carbon skeleton of triphenylene in its molecule are set forth below.

In the formula (1);

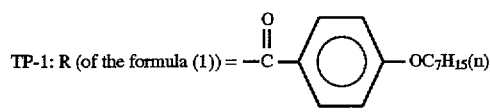

TP-1: R (of the formula (1)) =

TP-2: R =

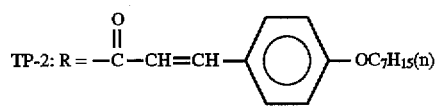

TP-3: R = —C$_4$H$_9$(n)
TP-4: R = —C$_6$H$_{13}$(n)

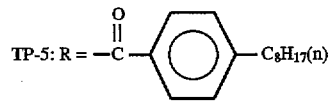

TP-5: R =

In the formula (2): $Z^2$=—CO—CR$^{21}$=CR$^{22}$—C$_6$H$_{5-n2}$—R$^{23}_{n2}$;

| R$^{21}$ | R$^{22}$ | R$^{23}$ | n2 |
|---|---|---|---|
| H | H | *4-OC$_7$H$_{15}$(n) | 1 |
| H | H | 4-OC$_6$H$_{13}$(n) | 1 |
| H | H | 4-OC$_8$H$_{17}$(n) | 1 |
| H | H | 4-OC$_9$H$_{19}$(n) | 1 |
| H | H | 4-OC$_{10}$H$_{21}$(n) | 1 |
| H | H | 4-OC$_{11}$H$_{23}$(n) | 1 |
| H | H | 4-OC$_{12}$H$_{25}$(n) | 1 |
| H | H | 4-OC$_7$H$_{15}$(n) | 1 |
| H | H | 3,4-di-OC$_7$H$_{15}$(n) | 2 |
| H | H | 3-OCH$_3$-4-OC$_7$H$_{15}$(n) | 2 |
| H | H | 4-C$_6$H$_{11}$(cyclo) | 1 |
| H | H | 4-C$_8$H$_{17}$(n) | 1 |
| H | H | 4-(CH$_2$)$_3$—OCH$_2$C≡CH | 1 |
| H | H | 4-(CF$_2$)$_4$—CF$_3$ | 1 |

*location bonded to benzen ring

In the formula (3):
$Z^3$=—CO—(CR$^{31}$R$^{32}$)$_{m3}$—(Y)$_{p3}$—C$_6$H$_{5-n3}$—R$^{33}_{n3}$;

| R$^{31}$ | R$^{32}$ | Y | R$^{33}$ | m3 | p3 | n3 |
|---|---|---|---|---|---|---|
| H | H | — | 4-OC$_7$H$_{15}$(n) | 1 | 0 | 1 |
| H | H | — | 4-OC$_6$H$_{13}$(n) | 1 | 0 | 1 |
| H | H | — | 4-OC$_5$H$_{11}$(n) | 1 | 0 | 1 |
| H | H | — | 4-OC$_8$H$_{17}$(n) | 1 | 0 | 1 |
| CH$_3$ | H | — | 4-OC$_9$H$_{19}$(n) | 1 | 0 | 1 |
| H | H | — | 4-OC$_5$H$_{11}$(n) | 2 | 0 | 1 |
| H | H | — | 3,4-di-OC$_4$H$_9$(n) | 2 | 0 | 2 |
| H | H | — | 4-O(C$_2$H$_4$O)$_2$—CH$_3$ | 1 | 0 | 1 |
| H | H | — | 4-OCH$_2$—(CF$_2$)$_3$—H | 1 | 0 | 1 |
| H | H | O | 4-OC$_7$H$_{15}$(n) | 1 | 1 | 1 |
| H | H | O | 4-O(CH$_2$)$_7$—CH$_3$ | 1 | 1 | 1 |
| H | H | S | 4-O(CH$_2$)$_7$—CH$_3$ | 1 | 1 | 1 |
| H | H | NH | 4-O(CH$_2$)$_7$—CH$_3$ | 1 | 1 | 1 |

In the formula (4):
$Z^4$=—(CR$^{41}$R$^{42}$)$_{m4}$(CR$^{44}$=CR$^{45}$)$_{p4}$—C$_6$H$_{5-n4}$—R$^{43}_{n4}$;

| R$^{41}$ | R$^{42}$ | R$^{44}$ | R$^{45}$ | R$^{43}$ | m4 | p4 | n4 |
|---|---|---|---|---|---|---|---|
| H | H | — | — | 4-OC$_7$H$_{15}$(n) | 1 | 0 | 1 |
| H | H | — | — | 4-OC$_6$H$_{13}$(n) | 1 | 0 | 1 |
| H | H | — | — | 4-OC$_5$H$_{11}$(n) | 1 | 0 | 1 |
| H | H | — | — | 4-OC$_8$H$_{17}$(n) | 1 | 0 | 1 |
| H | H | — | — | 4-OC$_9$H$_{19}$(n) | 1 | 0 | 1 |
| H | H | H | H | 4-OC$_7$H$_{15}$(n) | 1 | 1 | 1 |
| H | H | H | H | 4-OC$_5$H$_{11}$(n) | 1 | 1 | 1 |
| H | H | H | H | 4-OC$_5$H$_{11}$(n) | 2 | 0 | 1 |
| H | H | H | H | 3,4-di-OC$_4$H$_9$(n) | 1 | 0 | 2 |
| H | H | H | H | 4-O(C$_2$H$_4$O)$_2$—CH$_3$ | 1 | 0 | 1 |
| H | H | H | H | 4-OCH$_2$—(CF$_2$)$_3$—H | 1 | 0 | 1 |
| H | H | H | H | 4-C$_6$H$_{11}$(cyclo) | 1 | 1 | 1 |
| H | H | H | H | 4-(CH$_2$)$_7$—CH$_3$ | 1 | 0 | 1 |
| H | H | H | H | 4-(CH$_2$)$_7$—CH$_3$ | 2 | 0 | 1 |
| H | H | H | H | 4-(CH$_2$)$_7$—CH$_3$ | 3 | 0 | 1 |

In the formula (5): $Z^5$=—(CR$^{51}$R$^{52}$)$_{m5}$—CO—C$_6$H$_{5-n5}$—R$^{53}_{n5}$;

| R$^{51}$ | R$^{52}$ | R$^{43}$ | m5 | n5 |
|---|---|---|---|---|
| H | H | 4-OC$_7$H$_{15}$(n) | 1 | 1 |
| H | H | 4-OC$_6$H$_{13}$(n) | 1 | 1 |
| H | H | 4-OC$_5$H$_{11}$(n) | 1 | 1 |
| H | H | 4-OC$_8$H$_{17}$(n) | 1 | 1 |
| H | H | 4-OC$_9$H$_{19}$(n) | 1 | 1 |
| H | CH$_3$ | 4-OC$_7$H$_{15}$(n) | 1 | 1 |
| H | H | 4-OC$_5$H$_{11}$(n) | 2 | 1 |
| H | H | 3-OC$_5$H$_{11}$(n) | 1 | 1 |
| H | H | 3,4-di-OC$_4$H$_9$(n) | 1 | 2 |
| H | H | 4-O(C$_2$H$_4$O)$_2$—CH$_3$ | 1 | 1 |
| H | H | 4-OCH$_2$—(CF$_2$)$_3$—H | 1 | 1 |
| H | H | 4-C$_6$H$_{11}$(cyclo) | 1 | 1 |
| H | H | 4-(CH$_2$)$_7$—CH$_3$ | 1 | 1 |
| H | H | 4-(CH$_2$)$_7$—CH$_3$ | 2 | 1 |
| H | H | 4-(CH$_2$)$_7$—CH$_3$ | 3 | 1 |

In the formula (6): $Z^6$=—CO—C$_6$H$_{11-n6}$—R$^{63}_{n6}$;

| R$^{63}$ | n6 |
|---|---|
| 7-C$_5$H$_{11}$(n) | 1 |
| 7-C$_7$H$_{15}$(n) | 1 |
| 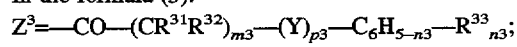 | 1 |
| 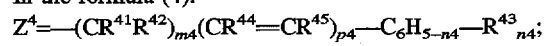 | 1 |
| 7-⌬—OC$_2$H$_5$ | 1 |

In the formula (7): $Z^7$=—CO—C$_6$H$_{5-n7}$—R$^{73}_{n7}$;

| R$^{73}$ | n7 |
|---|---|
| 4-OC$_7$H$_{15}$(n) | 1 |
| 4-OC$_6$H$_{13}$(n) | 1 |
| 4-OC$_5$H$_{11}$(n) | 1 |
| 4-OC$_8$H$_{17}$(n) | 1 |
| 4-OC$_9$H$_{19}$(n) | 1 |
| 3-OC$_7$H$_{15}$(n) | 1 |
| 3,5-di-OC$_5$H$_{11}$(n) | 2 |
| 3-OC$_5$H$_{11}$(n) | 1 |
| 3,4-di-OC$_4$H$_9$(n) | 2 |
| 4-O(C$_2$H$_4$O)$_2$—CH$_3$ | 1 |
| 4-OCH$_2$—(CF$_2$)$_3$—H | 1 |

-continued

| R$^{73}$ | n7 |
|---|---|
| 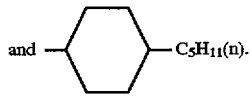—C$_5$H$_{11}$(n) | 1 |
| 4-(CH$_2$)$_7$—CH$_3$ | 1 |
| 4-(CH$_2$)$_6$—CH$_3$ | 1 |
| 4-(CH$_2$)$_5$—CH$_3$ | 1 |

In the formula (8): Z$^8$=—CO—R$^{83}$;

R$^{83}$: C$_7$H$_{15}$(n), C$_6$H$_{13}$(n), C$_5$H$_{11}$(n), C$_8$H$_{17}$(n), C$_9$H$_{19}$(n), OC$_7$H$_{15}$(n), OC$_5$H$_{11}$(n), NHC$_5$H$_{11}$(n), SC$_4$H$_9$(n), O(C$_2$H$_4$O)$_2$—CH$_3$, OCH$_2$—(CF$_2$)$_3$—H, and 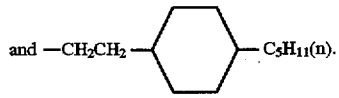—C$_5$H$_{11}$(n).

In the formula (9): Z$^9$=—R$^{93}$;

R$^{93}$: C$_7$H$_{15}$(n), C$_6$H$_{13}$(n), C$_5$H$_{11}$(n), C$_8$H$_{17}$(n), C$_9$H$_{19}$(n), O(C$_2$H$_4$O)$_2$—CH$_3$, OCH$_2$—(CF$_2$)$_3$—H, and —CH$_2$CH$_2$—⟨⟩—C$_5$H$_{11}$(n).

The 2,3,6,7,10,11-substituted triphenylene compounds as described above, can be obtained as their 6-methoxy substituted compounds according to trimer reaction of 1,2-dimethoxybenzene described in Macromol. Chem. Rapid Communication (vol. 4, pp.812, 1983). Further, a method described in Advanced Materials (vol. 2, pp.40, 1990) can be also utilized.

The optical compensatory sheet of the invention may be composed of only the layer of discotic liquid crystal. Generally, the sheet is composed of a transparent support and the layer of discotic liquid crystal thereon, and it is preferred that an orientation layer is further provided between the support and the layer of discotic liquid crystal. The orientation layer may be provided on the layer of discotic liquid crystal in the case that the layers are plurally provided on the support. A protective film or the support may be provided on the layer or another side of the support.

The discotic liquid crystal of the invention may be employed singly or in combination. For example, although the temperature forming discotic nematic liquid crystal phase is an inherent value (temperature) of the discotic nematic liquid crystal, the temperature can be controlled within a desired range by mixing two or more kinds of discotic liquid crystals and changing the mixed ratio. Further, optical phase structure and film-forming property of the discotic liquid crystal can be also controlled by the mixing.

As material of the transparent support of the invention, any material can be employed so long as they are transparent. The material preferably has a transmittance of not less than 80% and specially show optical isotropy when it is viewed from a front side. Further, the film preferably has a negative uniaxial property and an optic axis in the normal line direction.

Therefore, the film is preferably prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.).

However, materials having a large intrinsic birefringence such as polycarbonate, polyarylate, polysulfone and polyethersulfone can be also employed by rendering the materials optically isotropic through appropriately controlling molecular orientation in a procedure of forming a film.

The transparent film generally satisfies the condition of:

$$|nx-ny|/|nx-nz| \leq 0.2$$

in which nx and ny is main refrictictive indices within the film and nz is a main refractive index in a thickness direction of the film.

The transparent film preferably satisfies the condition of:

$$0 \leq |nx-ny| \times d \leq 50 \ (nm)$$

and more preferably:

$$0 |nx-ny| \times d \leq 20 \ (nm)$$

in which nx and ny has the same meanings as above and d is a thickness direction of the film.

Especially, the transparent film preferably satisfies the condition of:

$$20 \leq [(nx+ny)/2-nz] \times d \leq 400 \ (nm)$$

in which nx, ny and nz have the same meanings as above, whereby the viewing angle can be greatly increased. Further, the transparent film preferably satisfies the condition of:

$$30 \leq [(nx+ny)/2-nz] \times d \leq 150 \ (nm)$$

"nx", "ny", "nz" and "d" described above are shown in FIG. 1. "nx" and "ny" are main refractictive indices on the plane of the film, "nz" is a main refractive index in a thickness direction of the transparent film and d is the thickness of the film.

The orientation layer is generally provided on the transparent support. The orientation layer has a function of defining an orientation direction of a discotic liquid crystal provided thereon by a coating method, and the orientation gives an optic axis inclined (preferably at 5 to 50 degrees) from an optical compensatory sheet. As the orientation layer, any layers can be employed so long as they are capable of imparting orientation property to a layer of liquid crystal. Preferred examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from ω-tricosanoic acid, dioctadecyldimethylammoniumchloride, methyl stearate or an azobenzene derivative, that is isomerized by means of light to form a thin film of the molecules tilted uniformly in a certain direction, can be used as the orientation layer. In addition, a layer prepared by orienting dielectric materials by application of electric field or magnetic field can be employed as the orientation layer.

Examples of material for the orientation layer include polymers such as polymethyl metacrylate, acrylic acid/methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; and organic substances such as silan coupling agents.

Preferred examples of polymers for the orientation layer include polyimide, polystyrene, gelatin, polyvinyl alcohol and polyvinyl alcohol having an alkyl group (preferably having 6 or more carbon atoms). Orientation layers obtained by subjecting films of these polymers to orientation treatment, are capable of tilting obliquely discotic liquid crystal.

The polyvinyl alcohol having an alkyl group is especially preferred from the viewpoint of uniform orientation of the discotic liquid crystal. It is presumed that interaction between the alkyl chain on the orientation layer and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —(CH$_3$)C(CN)— or —(C$_2$H$_5$)N—CS—S—. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

Polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation layer for the discotic liquid crystal can be rubbed in the known manner which is conventionally performed to prepare an orientation layer for liquid crystal of LCD. In more detail, the treatment is a method that gives a function of orienting a liquid crystal to a surface of the orientation layer by rubbing the surface in a certain direction by the use of a paper, a gauze, a felt, a rubber, or a fiber of polyamide or polyester. The rubbing procedure is generally performed by rubbing a surface of the orientation layer in several times using a cloth in which fibers having uniform length and width are arranged.

As the orientation layer, an obliquely deposited layer of an inorganic compound is employable in the invention. Examples of the inorganic compounds include metal oxides or metal fluorides such as SiO, TiO$_2$, MgF$_2$ and ZnO$_2$ and metals such as Au and Al. As the inorganic compound, any compounds can be employed so long as they have high dielectric constant (permittivity). The obliquely deposited layer of an inorganic compound can be prepared using the metallizing apparatus. The support may be metallized in the fixed condition, or the continuous support may be continuously metallized to give a continuous layer.

The optical compensatory sheet is preferably prepared by forming an orientation layer on a transparent support and forming a layer of discotic liquid crystal on the orientation layer, as mentioned above.

Figure 2:
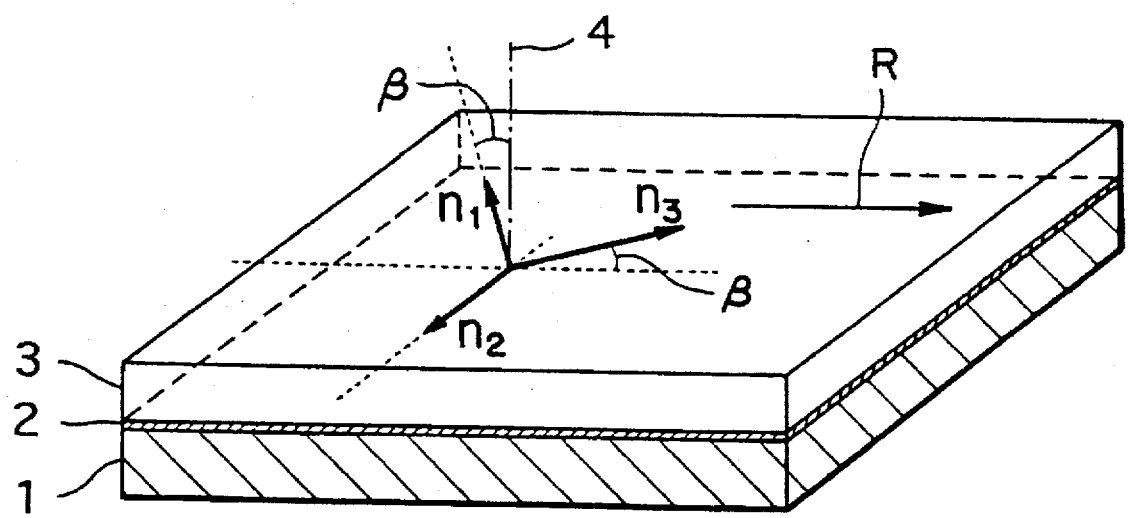
FIG. 2 is a view schematically showing the refractive indices of the three axes of the optical compensatory sheet of the invention.

The representative structure of the optical compensatory sheet employed in the invention is shown in FIG. 2. In FIG. 2, a transparent support 1, an orientation layer 2 and a layer of discotic liquid crystal 3 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_2 \leq n_3$, in the case that are seen in the front direction. The reference number β is an inclined angle of the optic axis from the normal 4 of the optical compensatory sheet.

The negative uniaxial property, that the optical compensatory sheet of the invention generally has, means property as satisfies the condition of:

$$n_1 < n_2 = n_3$$

in which $n_1$, $n_2$ and $n_3$ are refractive indices in the three axes directions of a optical compensatory sheet and $n_1$, $n_2$ and $n_3$ satisfy $n_1 \leq n_2 \leq n_3$. However, $n_2$ and $n_3$ are not required to be strictly equal to each other and it will be satisfied that they are approximately equal to each other. In more detail, there is no problem in practical use as long as the negative uniaxial property satisfies the condition of:

$$|n_2-n_3|/|n_2-n_1| \leq 0.2$$

in which $n_1$, $n_2$ and $n_3$ have the meanings described above.

In order to greatly improving viewing angle characteristics of TN-LCD or TFT-LCD, the optic axes of the optical compensatory sheet is generally inclined at 5 to 50 degrees from a normal line of the sheet (β in FIG. 3), preferably 10 to 40 degrees and especially 10 to 30 degrees.

Further, it is preferred that the sheet satisfies the condition of:

$$50 \leq [(n_3+n_2)/2-n_1] \times D \leq 400 \ (nm)$$

in which D is a thickness of the sheet; and especially the condition of:

$$100 \leq [(n_3+n_2)/2-n_1] \times D \leq 400 \ (nm)$$

The protective film may be provided on the discotic liquid crystal layer or on the reverse side (side having no layer) of the transparent support. Examples of material of the protective film include polymethyl metacrylate, acrylic acid/methacrylic acid copolymer, styrene/maleinimide anhydride copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate.

The optical compensatory sheet of the invention can be, for example, prepared by coating a solution containing a discotic liquid crystal on the transparent support in thin thickness to form a coated layer, drying the coated layer and heating the layer. On the transparent film, the orientation layer is generally formed as mentioned above. Hence, in the invention, the formation of the discotic liquid crystal layer can be performed using conventional coating method. In the case of coating the coating solution containing the discotic liquid crystal of the invention (preferably formula (1)) on a transparent support, it is generally found that the optic axes of the liquid crystals are oriented in a certain direction just after coating of the solution. Therefore, these discotic liquid crystals have inclination that is apt to orient.

The coating method includes curtain coating method, extrusion coating method, roll coating method, dip coating method, spin coating method, print coating method, coating method using slide coater and spray coating method. In the invention, vapor deposition method may be used. In the invention, a continuously coating method is preferred.

Therefore, coating methods such as curtain coating method, extrusion coating method, roll coating method and coating method using slide coater are preferred.

A coating solution of discotic liquid crystal employed in the coating method generally is a solution prepared by dissolving the liquid crystal in an organic solvent. The concentration of the liquid crystal in the solution or the kind of the solvent to be used cannot be so determined that can be applied to any liquid crystal, because the discotic liquid crystals show greatly different properties depending upon structure of the side chain in their molecules. However, in order to obliquely and uniformly orient the thin discotic liquid crystal, it is preferred to use the solvent capable of easily dissolving the liquid crystal. Preferred examples of the solvents include halogenated compounds such as dichloromethane and chloroform; ketones such as acetone and methyl ethyl ketone; amides such as dimethylacetoamide, dimethylformamide and N-methylpyrrolydone; and alcohols such as isopropylalcohol and perfluoropropanol.

Especially, the optical compensatory sheet of the invention can be continuously obtained by the process the steps of coating a solution containing a discotic liquid crystal capable of forming a discotic nematic phase or a monoaxial columnar phase on a continuous transparent support to form a coated layer, drying the layer, heating the layer to temperature forming the monoaxial columnar phase or discotic nematic phase for an appropriate time period, and cooling the layer to form a discotic liquid crystal layer having a mono-domain of one of the phases. The layer cooled to room temperature is made solid.

Although the temperature forming the columnar phase or discotic nematic liquid crystal phase is an inherent value (temperature) of the discotic nematic liquid crystal, the temperature can be controlled within a desired range by mixing two or more kinds of discotic liquid crystals and changing the mixed ratio. The temperature forming the columnar phase or discotic nematic liquid crystal phase preferably is in the range of 40° to 300° C., and especially in the range of 70° to 250° C.

In general, the coating solution is continuously coated on a orientation which already has been formed on the continuous transparent film. Coating method in the continuous process is preferred to use a slide coater. The heating for forming the columnar phase or discotic nematic liquid crystal phase preferably is performed in the range of 40° to 300° C. (preferably 70° to 250° C.) for 0.5 to 30 minutes (preferably 0.5 to 20 minutes). Further, cooling to room temperature (preferably 10° to 30° C.) after the heating treatment is preferably performed in extremely short time (preferably 1 to 10 seconds). Such rapid cooling can be conducted by bringing the coated layer into contact with a metal roller that is cooled at temperature of not higher than 30° C. (preferably 10° to 30° C.).

Figure 3:
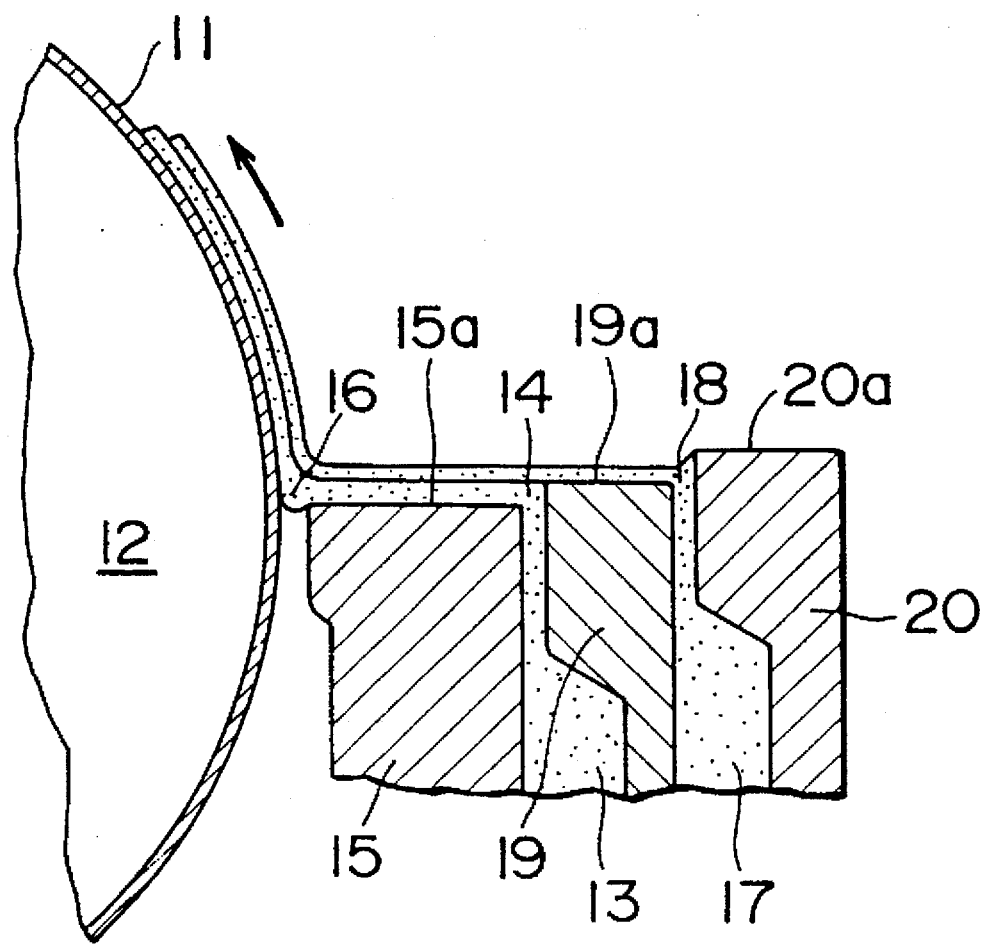
FIG. 3 is a sectional view of a slide coater employed in the case that the coating solution for forming a layer of discotic liquid crystal is continuously coated.

An example of the slide coater employable in the invention is shown in FIG. 3. In FIG. 3, the reference number 11 is a continuous film (support), the reference number 12 is a backing roll rotating in the arrow direction, the reference number 13 is a first coating solution, the reference number 14 is an outlet of a first coating solution, the reference number 15 is a first die-block, the reference number 15a is a surface of the first die-block 15, the reference number 16 is a bead, the reference number 17 is a second coating solution, the reference number 18 is an outlet of a second coating solution, the reference number 19 is a second die-block, the reference number 19a is a surface of the second die-block 19, the reference number 20 is a third die-block, and the reference number 20a is a surface of the second die-block 19.

When a first coating solution 13 is fed from outlet of a first coating solution 14 to the surface of the die-block 15a, the solution is spread out on the surface. The solution further reaches the edge of the surface of the die-block 15a, and forms a bead between the continuous film and the edge. Then, the solution is stretched 10 times with movement of the film to be coated on the film. Similarly, by employing the second coating solution, two layers of two coating solutions can be formed in the film. In the invention, only one layer is generally formed in the above manner.

The oblique angle of the slide coater in the invention means angle of the surface of the die-block (15a, 19a or 20a) to a horizontal plane. The slide coater preferably has an oblique angle of not more than 9 degrees.

The slide coater is described in U.S. Pat. No. 2,762,791 and Japanese Patent Provisional Publications No. 56(1981)-133067 and No. 49(1974)-107040.

By performing the continuous coating, the optical compensatory sheet of a large area comprising the support and the discotic liquid crystal layer provided thereon can be easily obtained. Further, the obtained discotic liquid crystal layer is a mono-domain layer that the liquid crystals are uniformly oriented.

The representative structure of the optically compensatory sheet obtained in the above manner has a structure shown in FIG. 2 as mentioned above.

Figure 4:
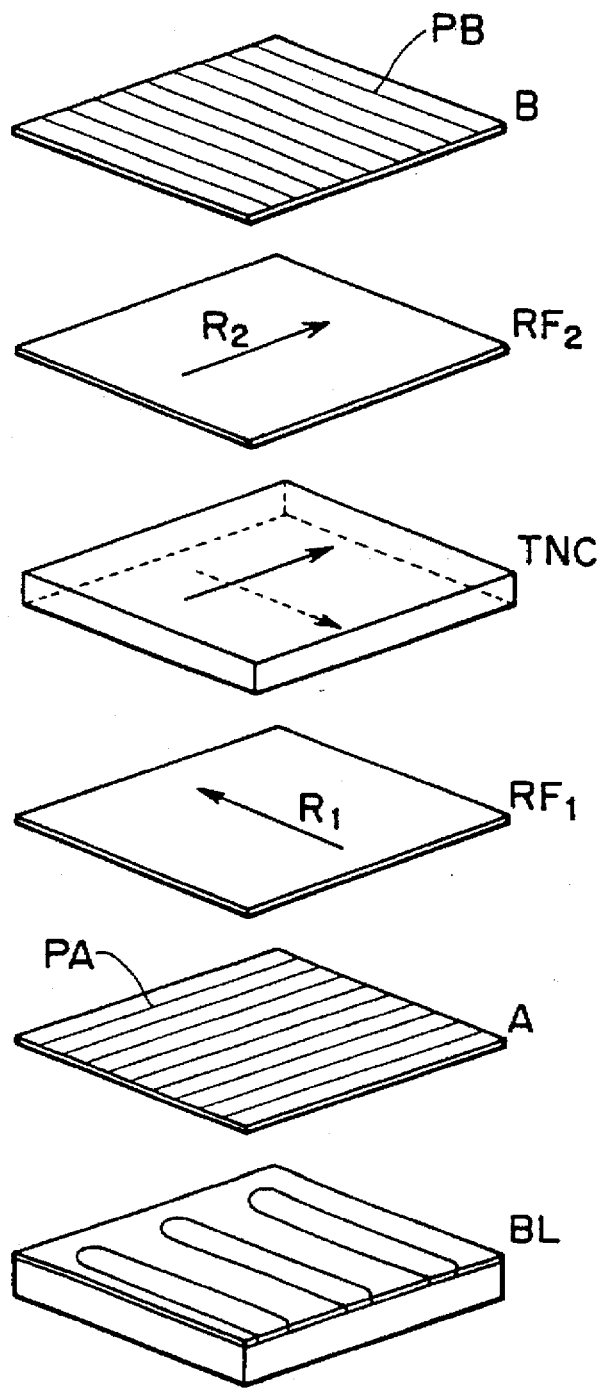
FIG. 4 is a view schematically showing the representative structure of the liquid crystal display of the invention.

The representative structure of the liquid crystal display of the invention is shown in FIG. 4. In FIG. 4, a liquid crystal cell TNC comprising a pair of substrates provided with a transparent electrode and a twist-oriented nematic liquid crystal sealed therebetween, a pair of polarizing sheets A and B arranged on the both sides of the cell, the optical compensatory sheets $RF_1$ and $RF_2$ between the liquid crystal cell and the polarizing sheet and back light BL are assembled to constitute the liquid crystal display. The optical compensatory sheet may be arranged only on one side (i.e., use of one of $RF_1$ and $RF_2$). The reference number $R_1$ is a rubbing direction of the orientation layer of the optical compensatory sheets $RF_1$, and the reference number $R_2$ is the rubbing direction of the orientation layer of the optical compensatory sheets $RF_2$, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

The reason why the optical compensatory sheet indicated in FIG. 3 gives much increase of viewing angle is assumed as follows:

Most of TN-LCD adopt normally white mode. In the mode, a light transmittance in a black display portion extremely increases with increase of viewing angle, which results in rapid reduction of contrast. In the condition of black display (the condition where voltage is applied), it is considered that TN-type liquid crystal cell shows an optically anisotropic property and a positive uniaxial property which is slightly inclined from a normal to a surface of the cell.

In the case that an optic axis of the TN-type liquid crystal cell is inclined from the normal to a surface of the cell, use of a optically anisotropic substance having an optic axis in a normal direction is considered not to appropriately compensate the phase difference by the cell. In other words, an optically anisotropic substance is needed for the cell to have an optic axis inclined from the normal. Further, when the cell is regarded as a composite of optically anisotropic substances with a positive uniaxial property, an optically anisotropic substance having a negative uniaxial property is suitably used for compensation of phase difference by the cell. Thus, use of an optically anisotropic substance of a negative uniaxial property having optic axis inclined from the normal improves viewing angle characteristics.

However, it is mere approximation that the liquid crystal cell behaves as optically anisotropic substance with a positive uniaxial property having optic axis inclined from the normal. Therefore, use of the optically anisotropic substance does not give satisfactorily compensation of phase difference.

The TN-type liquid crystal cell can be regarded as a composite of two optically anisotropic substances having a positive uniaxial property which has a inclined angle equal to each other and inclination direction differing from each other. When an intermediate gradation is displayed, optic axes of the optically anisotropic substances are further inclined from the normal to a surface of the cell.

In the case that the TN-type liquid crystal cell is considered as above, great improvement of viewing angle characteristics can be obtained by employing the optical compensatory sheet which is prepared by, for example, superposing an optical anisotropic substance (discotic liquid crystal layer) having an optically negative monoaxial and an optic axis inclined at 5 to 50 degree to the normal, on an optically anisotropic substance (transparent support) having an optically negative monoaxial and an optic axis in the normal direction.

As materials of liquid crystal employed for the liquid crystal cell, any known materials can be employed so long as they are TN-CL or STN-CL.

Examples of the present invention and comparison examples are given below, but these examples by no means restrict the invention.

SYNTHETIC EXAMPLE 1

Synthesis of discotic liquid crystal (TP-1)

1-a) Synthesis of 2,3,6,7,10,11-hexamethoxytriphenylene (a)

In a 2-liter three-necked flask cooled with ice, 135 ml of ice water was placed, and 490 ml of concentrated sulfuric acid was gradually added to the ice water with stirring to prepare a sulfuric acid solution. Subsequently, 150 g of iron(III) chloride was added to the sulfuric acid solution at room temperature, and after reaction of 1 hour, 30 g of 1,2-dimethoxybenzene was further added to prepare a reaction mixture. After reaction of 3 hours, the reaction mixture was cooled with ice, and 1 liter of ice water was gradually added to the reaction mixture. After stirring of 1 hour, the reaction mixture was filtered through a glass filter to obtain crude crystals of the above compound (a) of 13 g (yield: 43%).

1-b) Synthesis of 2,3,6,7,10,11-hexahydroxytriphenylene

In 50 ml of dichloromethane, 10.3 g of the compound (a) was suspended to prepare a suspension and 15.5 ml of boron trifluoride was gradually added to the suspension. After reaction of 2 hours, 500 ml of ice water was added to the suspension, and the suspension was extracted with 2.5 liter of ethyl acetate. The extraction was dried over anhydrous sodium sulfate and filtered through Celite (diatomaceous earth). After the obtained filtrate was concentrated by removing the solvent in vacuo, the resultant residue was recrystallized from a mixed solvent of acetonitrile and dichloromethane to obtain the above compound (b) of 7.50 g (yield: 92%).

1-c) Synthesis of 4-heptyloxybenzoic acid (c)

In a 1-liter three-necked flask were placed 35.0 of ethyl 4-hydroxybenzonate, 54.6 g of bromoheptyl, 150 g of potassium carbonate and 100 ml of acetonitrile, and were vigorously stirred for 6 hours with a mechanical stirrer while the flask was heated in oil bath under reflux. After the obtained reaction mixture was cooled, it was filtered through Celite, and the resultant residue was washed with 300 ml of ethyl acetate. After the obtained filtrate was concentrated by removing the solvent in vacuo, the resultant residue was dissolved in 200 of ethanol. Then, an aqueous solution (40 ml) containing sodium hydroxide of 15 g was dropwise added gradually to the ethanol solution and stirred at 80° C. for 1 hour. After the resultant reaction mixture was cooled, the precipitated crystals were filtered in vacuo, and the residue was washed with 100 ml of ethanol. The washed residue was placed in 300 ml of dilute hydrochloric acid of 40° C., and stirred for 1 hour. The reaction mixture was filtered in vacuo and dried to obtain the above compound (c) of 40.0 g (yield: 80%).

1-d) Synthesis of 2,3,6,7,10,11-hexa(4-heptyloxybenzoyloxy) triphenylene (TP-1)

In a 200 flask, 8.34 g of the compound (c) and 10 ml of thionyl chloride were placed, and heated under reflux for 2 hours. The excess thionyl chloride was removed in vacuo under heating. After the reaction mixture was cooled, 0.70 g of the compound (b) and 20 ml of pyridine were added to the mixture and stirred under reflux with heating for 20 hours. After the resultant reaction mixture was cooled, the excess pyridine was removed in vacuo, and then pure crystals of the above compound (d) of 3.05 g (yield: 75%) were isolated by means of silica-gel chromatography.

NMR (Solvent for measurement: $CDCl_3$) $\delta 0.92$ (18H, t), $\delta 1.35$ (48H, m), $\delta 1.78$ (12H, m), $\delta 3.90$ (12H, t), $\delta 6.65$ (12H, d), $\delta 7.90$ (12H, d), $\delta 8.37$ (6H, s), Measurement of phase transition temperature by DSC and polarization microscope Crystal phase←169° C.→Discotic nematic phase←257° C.→Isotropic phase

SYNTHETIC EXAMPLE 2

Synthesis of discotic liquid crystal (TP-2)

1-e) Synthesis of 4-heptyloxycinnamic acid (e)

In 50 ml of dimethyl sulfoxide was suspended 15.5 g of 4-hydroxycinnamic acid, 30.0 g of bromoheptyl and 50.0 g of potassium carbonate, and were vigorously stirred for 10 hours with a mechanical stirrer while the flask was heated in oil bath under reflux. After the obtained reaction mixture was cooled, it was filtered through Celite, and the resultant residue was washed with 300 of ethyl acetate. After 500 ml of water was added to the washed mixture and the mixture was extracted with 2.5 liter of ethyl acetate, the obtained extract (organic layer) was concentrated by removing the solvent in vacuo. To the resultant residue was added 100 ml of ethanol, an aqueous solution (20 ml) containing sodium hydroxide of 10 g was added and stirred at 80° C. for 1 hour. After the resultant reaction mixture was cooled, the precipitated crystals were filtered in vacuo, and the residue was washed with 100 ml of ethanol. The washed residue was placed in 300 of dilute hydrochloric acid of 40° C., and stirred for 1 hour. The reaction mixture was filtered in vacuo and dried to obtain the above compound (e) of 19.1 g (yield: 78%).

1-f) Synthesis of 2,3,6,7,10,11-hexa(4-heptyloxycinnamoyloxy) triphenylene (TP-2)

In a 200 ml flask were placed 10.4 g of the compound (e) and 10 ml of thionyl chloride, and heated under reflux for 2 hours. The excess thionyl chloride was removed in vacuo under heating. After the reaction mixture was cooled, 0.70 g of the compound (b) and 20 ml of pyridine were added to the mixture and stirred under reflux with heating for 20 hours.

After the resultant reaction mixture was cooled, the excess pyridine was removed in vacuo. The reaction mixture was further purified by means of silica-gel chromatography, and then recrystallized from a mixed solvent of acetonitrile and acetone to isolate pure crystals of the above compound (TP-2) of 3.55 g (yield: 90%).

NMR (Solvent for measurement: $CDCl_3$) $\delta 0.92$ (18H, t), $\delta 1.35$ (48H, m), $\delta 1.78$ (12H, m), $\delta 3.90$ (12H, t), $\delta 6.50$ (6H, d), $\delta 6.65$ (12H, d), $\delta 7.25$ (12H, d), $\delta 7.83$ (6H, d), $\delta 8.20$ (6H, s), Measurement of phase transition temperature by DSC and polarization microscope Crystal phase←155° C.→Discotic nematic phase←252° C.→Isotropic phase

EXAMPLE 1
Preparation of optical compensatory sheet

SiO was obliquely deposited on a glass plate, to form a orientation layer (thickness: approx. 400 Å) having an oblique angle (deposition angle) of 45 degrees.

On the orientation layer, a 10 weight % coating solution of the discotic liquid crystal TP-2 (compound previously mentioned) obtained by dissolving TP-2 in dichloromethane was coated and dried at room temperature. Thereafter, the coated layer was heated to 220° C., subjected to heat treatment at this temperature for 10 minutes, and then cooled to room temperature to form a colorless and transparent layer of discotic liquid crystal having a thickness of 2 μm. Thus, an optical compensatory sheet was obtained.

The obtained layer of discotic liquid crystal was observed using a microscope. As a result, it was confirmed that the layer was an optically uniform mono-domain because disclination showing disorder of molecular orientation in the layer was not observed under a microscope of 10 magnifications.

Separately, a polycarbonate film of the perfect mono-domain which had the same retardation as that of the above layer was prepared in the known manner. The obtained layer of discotic liquid crystal showed transmittance of 91% based on that of the perfect mono-domain.

EXAMPLE 2
Preparation of liquid crystal display

The optical compensatory sheet obtained in Example 1 were fixed to TN-type liquid crystal cell that showed the product of the difference of refractive index between the extraordinary ray and the ordinary ray passing through the liquid crystal cell and the clearance between the substrates of the liquid crystal cell of 480 nm (i.e., product x clearance), and had a liquid crystal of a twisted angle of 90 degrees.

The obtained TN-LCD had the same structure as shown in FIG. 4 except for having no RF1. As was apparent from FIG. 4, two polarizing axes (PA, PB) of the polarizing sheets A and B were so arranged as to intersect at right angles. Further the optic axis of the optical compensatory RF2 was so arranged as to bisect an angle of the two polarizing axes although there was no illustration.

Comparison Example 1
Preparation of liquid crystal display

The TN-LCD of Example 2 having no optical compensatory sheet was prepared.

[Evaluation of liquid crystal display]

To the TN-LCD, a rectangular wave of 30 Hz was applied at a voltage of 0 to 5 V, and contrasts in various incident angles were measured by varying viewing angle using a spectrophotometer (LCD-5000, available from Otsuka Electronics Co., Ltd.) to determine incident angle dependence of contrast. The angle against the normal at which the contrast ($T_{0V}/T_{5V}$) on a black-and-white display showed 10 was defined as viewing angle and the viewing angles in a height (upper-lower) direction and a width (left-right) direction of the TN-LCD were determined.

Further, the display was placed in a thermostat of 50° C. for 500 hours, and thereafter the viewing angle was measured.

The obtained result is set forth in Table 1.

TABLE 1

| Example | Sheet | Viewing Angle upper-lower (degree) | Viewing Angle left-right (degree) | Viewing Angle (after 500 hours) upper-lower (degree) |
|---|---|---|---|---|
| Ex. 2 | Provided | 46–48 | 52–55 | 43–47 |
| Com. Ex. 1 | None | 23–27 | 33–36 | 23–27 |

As apparent from Table 1, the display of Example 2 showed extremely high viewing angle compared with one of Comparison Example 1. Further, durability under the condition of high temperature was also greatly improved.

EXAMPLE 3
Preparation of optical compensatory sheet

On a continuous film of triacetyl cellulose (thickness: 80 μm, width: 250 mm, Fuji Tack available from Fuji Photo Film Co., Ltd.), a coating solution containing poll;vinyl alcohol having long chain alkyl groups (MP-203, produced by Kuraray Co., Ltd.) was coated by the use of a bar coater, dried using warm air to form a layer of the polyvinyl alcohol (thickness: 1 μm) and rubbing a surface of the layer by bringing it in contact with a rubbing roller to form an orientation layer.

On the orientation layer of the continuous film, a coating solution of 5 weight % obtained by dissolving a mixture of the discotic liquid crystal (A) and the discotic liquid crystal (B) ((A): $R^{73}=4$—$OC_7H_{15}$(n) and n7=1 of the formula (7), and (B): $R^{73}=3$—$OC_5H_{11}$(n) and n7=1 of the formula (7); these compounds being previously mentioned; mixed ratio: (A):(B)=4:1, by weight) in methyl ethyl ketone was continuously coated using a slide coater (shown in FIG. 3) having an oblique angle of 5 degrees. The coating was conducted under the conditions of film feeding rate of 20 m/min. and coated amount of 15.4 $cc/m^2$.

Thereafter, the coated layer was passed a heating area heated to 145° C. over a period of 2 minutes, and brought the continuous film in contact with a metal roller cooled at 10°–20° C. to rapidly cool to room temperature, whereby a layer of oriented discotic liquid crystal having a thickness of 1.0 μm was formed. Thus, an optical compensatory sheet of the invention was prepared.

The layer of discotic liquid crystal was observed using a microscope. As a result, it was confirmed that the layer was an optically uniform mono-domain because disclination showing disorder of molecular orientation in the layer was not observed under a microscope of 10 magnifications.

Separately, a polycarbonate film of the perfect mono-domain which had the same retardation as that of the above layer was prepared in the known manner. The obtained layer of discotic liquid crystal showed transmittance of 95% based on that of the perfect mono-domain.

Further, the optimum retardation (Δn·d) of the triacetyl cellulose film was determined. Re values at various incident angles were measured by an ellipsometer (AEP-100, available from Shimadzu Seisakusho, Ltd.) in transmission mode to determine incident angle dependence of Re. From Data of the incident angle dependence of Re, the optimum retardation (Δn·d) was calculated to obtain 50 nm.

EXAMPLE 4
Preparation of optical compensatory sheet

The procedure of Example 3 was repeated except for employing a coating solution of 10 weight % obtained by dissolving the discotic liquid crystal TP-2 (compound previously mentioned) in dichloromethane (which was employed in Example 1) instead of a coating solution of 5 weight % of the discotic liquid crystal (A) and the discotic liquid crystal (B) in methyl ethyl ketone, and changing temperature of the heating area to 220° C., to prepare an optical compensatory sheet.

The layer of discotic liquid crystal was observed using a microscope. As a result, it was confirmed that the layer was an optically uniform mono-domain because disclination showing disorder of molecular orientation in the layer was not observed under a microscope of 10 magnifications.

The obtained layer of discotic liquid crystal showed transmittance of 96% based on that of the polycarbonate film of the perfect mono-domain of the Example 1.

REFERENCE EXAMPLE 1
Preparation of optical compensatory sheet

The procedure of Example 3 was repeated except for employing a bar coater instead of the slide coater and not performing continuous coating to prepare an optical compensatory sheet.

The layer of discotic liquid crystal was observed using a microscope. As a result, it was confirmed that the layer showed disorder of oriented direction originated from stripe pattern by coating and it was an multi-domain.

EXAMPLE 5
Preparation of liquid crystal display

A pair of the optical compensatory sheets obtained in Example 3 were fixed to both sides of TN-type liquid crystal cell that showed the product of the difference of refractive index between the extraordinary ray and the ordinary ray passing through the liquid crystal cell and the clearance between the substrates of the liquid crystal cell of 480 nm (i.e., product×clearance), and had a liquid crystal of a twisted angle of 90 degrees.

The obtained TN-LCD had a structure shown in FIG. 4.

REFERENCE EXAMPLE 2
Preparation of liquid crystal display

The procedure of Example 5 was repeated except for using the optical compensatory sheets obtained in Reference Example 1 in place of those obtained in Example 3 to prepare a liquid crystal display (TN-LCD) for reference.

The obtained TN-LCD had a structure shown in FIG. 4.

[Evaluation of Liquid Crystal Display]

To the TN-LCD, a rectangular wave of 40 Hz was applied at a voltage of 0 to 5 V, and transmittances (T) in the normal direction to a surface of the cell were measured using a spectrophotometer (LCD-5000, available from Otsuka Electronics Co., Ltd.). From the measured data, contrast ($T_{OV}/T_{5V}$) in the normal to a surface of the cell was determined.

As a result, the display of Example 5 showed contrast of 95, while the display of Reference Example 2 showed that of 52.

We claim:

1. An optical compensatory sheet which comprises a layer in the condition of a mono-domain of a discotic nematic phase, an optic axis of the sheet being inclined at 5 to 50 degrees from a line normal to the sheet.

2. The optical compensatory sheet as defined in claim 1, which comprises a transparent support and the layer in the condition of the mono-domain provided thereon.

3. The optical compensatory sheet as defined in claim 2, wherein an orientation layer is provided between the transparent support and the layer in the condition of the mono-domain.

4. The optical compensatory sheet as defined in claim 1, wherein the layer in the condition of the mono-domain is formed from a compound having a triphenylene structure in its molecule.

5. The optical compensatory sheet as defined in claim 1, wherein the layer in the condition of the mono-domain is formed from a compound having the formula (1):

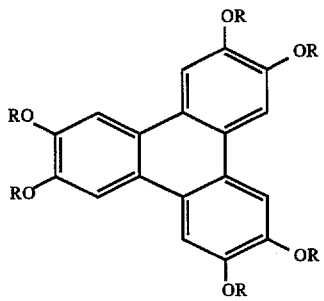

in which R represents an alkyl group, a substituted alkyl group, an aryl group, a substituted aryl group, an alkanoyl group, a substituted alkanoyl group, a substituted alkenoyl group, a substituted alkynoyl group, an aryloyl group, a substituted aryloyl group, an alkoxycarbonyl group, a substituted alkoxycarbonyl group, an aryloxycarbonyl group, a substituted aryloxycarbonyl group, a substituted carbamoyl group or a substituted sulfamoyl group.

6. The optical compensatory sheet as defined in claim 5, wherein R of the formula (1) is one substituent selected from the group consisting of $Z^2$ to $Z^9$ represented by the formulae (2) to (9):

$$Z^2 = -CO-CR^{21} = CR^{22} - C_6H_{5-n2} - R^{23}_{n2} \qquad (2)$$

in which each of $R^{21}$ and $R^{22}$ independently represents a hydrogen atom, a halogen atom, an alkyl group or a substituted alkyl group, $R^{23}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, and n2 is an integer of 0 to 5, plural substituents presented by $R^{23}_{n2}$ being the same or different from each other;

$$Z^3 = -CO-(CR^{31}R^{32})_{m3}-(Y)_{p3}-C_6H_{5-n3}-R^{33}_{n3} \qquad (3)$$

in which each of $R^{31}$ and $R^{32}$ independently represents a hydrogen atom, a halogen atom, an alkyl group or a substituted alkyl group, Y represents a oxygen atom, a sulfur atom or —NH—, $R^{33}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, m3 is an integer of 1 to 4, p3 is 0 or 1, and n3 is an integer of 0 to 5, plural substituents presented by $R^{33}_{n3}$ being the same or different from each other;

$$Z^4 = -(CR^{41}R^{42})_{m4}-(CR^{44}=CR^{45})_{p4}-C_6H_{5-n4}-R^{43}_{n4} \qquad (4)$$

in which each of $R^{41}$, $R^{42}$, $R^{44}$ and $R^{45}$ independently represents a hydrogen atom, a halogen atom, an alkyl group or a substituted alkyl group, $R^{43}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, m4 is an integer of 1 to 5, p4 is an integer of 0 to 2, and n4 is an integer of 0 to 5, plural substituents presented by $R^{43}{}_{n4}$ being the same or different from each other;

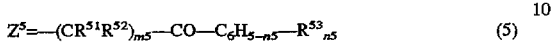

$$Z^5 = -(CR^{51}R^{52})_{m5} - CO - C_6H_{5-n5} - R^{53}{}_{n5} \qquad (5)$$

in which each of $R^5$ and $R^{52}$ independently represents a hydrogen atom, a halogen atom, an alkyl group or a substituted alkyl group, $R^{53}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, m5 is an integer of 1 to 4, and n5 is an integer of 0 to 5, plural substituents presented by $R^{53}{}_{n5}$ being the same or different from each other;

$$Z^6 = -CO - C_6H_{11-n6} - R^{63}{}_{n6} \qquad (6)$$

in which $R^{63}$ represents a hydrogen atom, a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, and n6 is an integer of 0 to 11, plural substituents presented by $R^{63}{}_{n6}$ being the same or different from each other;

$$Z^7 = -CO - C_6H_{5-n7} - R^{73}{}_{n7} \qquad (7)$$

in which $R^{73}$ represents a halogen atom, a cyano group, an alkyl group, a substituted alkyl group, a cycloalkyl group, a substituted cycloalkyl group, an aryl group, a substituted aryl group, an alkoxy group, a substituted alkoxy group, an aryloxy group or a substituted aryloxy group, and n7 is an integer of 0 to 5, plural substituents presented by $R^{73}{}_{n7}$ being the same or different from each other;

$$Z^8 = -CO - R^{83} \qquad (8)$$

in which $R^{83}$ represents an alkyl group, a substituted alkyl group, an alkenyl group, a substituted alkenyl group, an alkynyl group, a substituted alkynyl group, a cycloalkyl group, a substituted cycloalkyl group, a heterocyclic group, a substituted heterocyclic group, an alkylamino group or an alkylthio group;

$$Z^9 = -R^{93} \qquad (9)$$

in which $R^{93}$ represents an alkyl group, a substituted alkyl group, an alkenyl group, a substituted alkenyl group, an alkynyl group or a substituted alkynyl group.

7. The optical compensatory sheet as defined in claim 2, wherein the transparent support has a light transmittance of not less than 80%, shows optically isotropy on the plane of the film, and satisfies the condition of:

$$30 \leq [(nx+ny)/2-nz] \times d \leq 150$$

in which nx and ny are main refractive indices on a plane of the support, nz is a main refractive index in the thickness direction, and d is the thickness of the film in nm.

8. The optical compensatory sheet as defined in claim 3, wherein the orientation layer is a polymer layer which has been subjected to rubbing treatment.

9. The optical compensatory sheet as defined in claim 3, wherein the orientation layer is prepared by obliquely depositing an inorganic compound on the support.

10. A process for preparation of an optical compensatory sheet, which comprises the steps of:
    coating a solution containing a compound capable of forming a discotic nematic phase on a transparent support to form a coated layer,
    heating the coated layer to temperature for forming the discotic nematic phase, and
    cooling the coated layer to form a layer in the condition of a mono-domain of the discotic nematic phase, whereby an optical compensatory sheet comprising the transparent support and the layer in the condition of a mono-domain, an optic axis of the sheet being inclined at 5 to 50 degrees from a line normal to the sheet is prepared.

11. The process for preparation of an optical compensatory sheet as defined in claim 10, wherein the solution is continuously coated on the transparent support.

12. The process for preparation of an optical compensatory sheet as defined in claim 10, wherein the transparent support is a continuous transparent film.

13. The process for preparation of an optical compensatory sheet as defined in claim 10, wherein the transparent support has an orientation layer thereon and the solution is coated on the orientation layer.

14. The process for preparation of an optical compensatory sheet as defined in claim 10, wherein coating of the solution is performed using a slide coater.

15. The process for preparation of an optical compensatory sheet as defined in claim 14, wherein the slide coater has an oblique angle of not more than 9 degrees.

16. The process for preparation of an optical compensatory sheet as defined in claim 10, wherein the solution is prepared by dissolving the compound in at least one solvent selected from the group consisting of dichloromethane, chloroform, acetone, methyl ethyl ketone, dimethylacetoamide, dimethylformamide, N-methylpyrrolydone, isopropylalcohol and perfluoropropanol.

17. A liquid crystal display comprising a liquid crystal cell which comprises a pair of substrates provided with a transparent electrode and twist-oriented nematic liquid crystal sealed therebetween, a pair of polarizing sheets arranged on both sides of the cell, and an optical compensatory sheet provided between the liquid crystal cell and the polarizing sheet;
    wherein the optical compensatory sheet comprises a layer in the condition of a mono-domain of a discotic nematic phase, an optic axis of the sheet being inclined at 5 to 50 degrees from a line normal to the sheet.

18. The liquid crystal display as defined in claim 17, wherein the optical compensatory sheet comprises a transparent support and the layer in the condition of the mono-domain provided thereon.

19. The liquid crystal display as defined in claim 18, wherein an orientation layer is provided between the transparent support and the layer in the condition of the mono-domain.

20. The liquid crystal display as defined in claim 17, wherein the layer in the condition of the mono-domain is formed from a compound having a carbon skeleton of triphenylene in its molecule.

* * * * *